(12) United States Patent
Gilmour

(10) Patent No.: US 11,640,015 B1
(45) Date of Patent: May 2, 2023

(54) REMOVAL OF LIQUID DROPS FROM OPTICAL ELEMENT

(71) Applicant: GoPro, Inc., San Mateo, CA (US)

(72) Inventor: Nicholas Ryan Gilmour, San Jose, CA (US)

(73) Assignee: GoPro, Inc., San Mateo, CA (US)

( * ) Notice: Subject to any disclaimer, the term of this patent is extended or adjusted under 35 U.S.C. 154(b) by 161 days.

(21) Appl. No.: 17/129,317

(22) Filed: Dec. 21, 2020

Related U.S. Application Data (60) Provisional application No. 62/952,556, filed on Dec. 23, 2019.

(51) Int. Cl.
*G02B 1/18* (2015.01)
*H04N 23/81* (2023.01)

(52) U.S. Cl.
CPC ............. *G02B 1/18* (2015.01); *H04N 23/811* (2023.01)

(58) Field of Classification Search
CPC ................. G02B 1/18; H04N 5/2171
See application file for complete search history.

(56) References Cited

U.S. PATENT DOCUMENTS

2011/0080494 A1* 4/2011 Mori ................... H04N 5/2171
348/222.1
2018/0264526 A1* 9/2018 Kim ................... G02B 27/0006

* cited by examiner

*Primary Examiner* — Antoinette T Spinks
(74) *Attorney, Agent, or Firm* — Esplin & Associates, PC (57) ABSTRACT

An image capture device may detect presence of drop of liquid on its optical element during capture of visual content. The image capture device may effectuate removal of the drop of liquid from the optical element.

18 Claims, 6 Drawing Sheets

REMOVAL OF LIQUID DROPS FROM OPTICAL ELEMENT

FIELD

This disclosure relates to removing liquid drops from optical element of image capture device.

BACKGROUND

Drops of liquid on optical elements of image capture devices may distort light being received by the image capture devices and may cause distortions in images captured by the image capture devices.

SUMMARY

This disclosure relates to image capture devices that removes liquid drops. An image capture device may include a housing. The housing may carry one or more of an image sensor, an optical element, and/or other components. The image sensor may generate a visual output signal conveying visual information defining visual content based on light guided thereto by the optical element. The visual content may be captured through the optical element during a capture duration. Presence of a drop of liquid on the optical element during the capture duration may be determined based on analysis of the visual content and/or other information. Responsive to the presence of the drop of liquid on the optical element, removal of the drop of liquid from the optical element may be effectuated An electronic storage may store visual information defining visual content, information relating to visual content, information relating to optical element, information relating to liquid, information relating to drop of liquid on optical element, information relating to removal of drop of liquid from optical element, and/or other information.

The housing may carry one or more components of the image capture device. The housing may carry (be attached to, support, hold, and/or otherwise carry) one or more of an image sensor, an optical element, a processor, an electronic storage, and/or other components.

The image sensor may be configured to generate a visual output signal and/or other output signals. The visual output signal may convey visual information based on light that becomes incident thereon and/or other information. The visual information may define visual content.

The optical element may be configured to guide light within a field of view to the image sensor. The field of view may be less than 180 degrees. The field of view may be equal to 180 degrees. The field of view may be greater than 180 degrees.

The processor(s) may be configured by machine-readable instructions. Executing the machine-readable instructions may cause the processor(s) to facilitate removing liquid drops. The machine-readable instructions may include one or more computer program components. The computer program components may include one or more of a capture component, a presence component, a removal component, and/or other computer program components.

The capture component may be configured to capture the visual content during one or more capture durations. The visual content may be captured through the optical element.

The presence component may be configured to determine presence of one or more drops of liquid on the optical element during the capture duration. The presence of the drop(s) of liquid on the optical element may be determined based on analysis of the visual content and/or other information. In some implementations, the analysis of the visual content may include analysis of blurring within the visual content. In some implementations, the analysis of the visual content may include analysis of change in focus within the visual content. In some implementations, the analysis of the visual content may include analysis of repetitive depictions within the visual content. In some implementations, the analysis of the visual content may include analysis of shaky depictions within the visual content.

The removal component may be configured, responsive to the presence of the drop(s) of liquid on the optical element, to effectuate removal of the drop(s) of liquid from the optical element. In some implementations, the removal of the drop(s) of liquid from the optical element may be effectuated by causing an imbalance of electric charges on or proximate to the optical element. The imbalance of electric charges may move the drop(s) of liquid. In some implementations, the removal of the drop(s) of liquid from the optical element may be effectuated by application of an electric voltage to the optical element. The electric voltage may move the drop(s) of liquid. In some implementations, the removal of the drop(s) of liquid from the optical element may be effectuated by causing vibration of the optical element. The vibration of the optical element may move the drop(s) of liquid.

In some implementations, the removal of the drop(s) of liquid from the optical element may be effectuated by generating one or more alarms. An alarm may indicate the presence of the drop(s) of liquid on the optical element. An alarm may include an audible alarm, a visible alarm, a haptic alarm, and/or other alarm.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
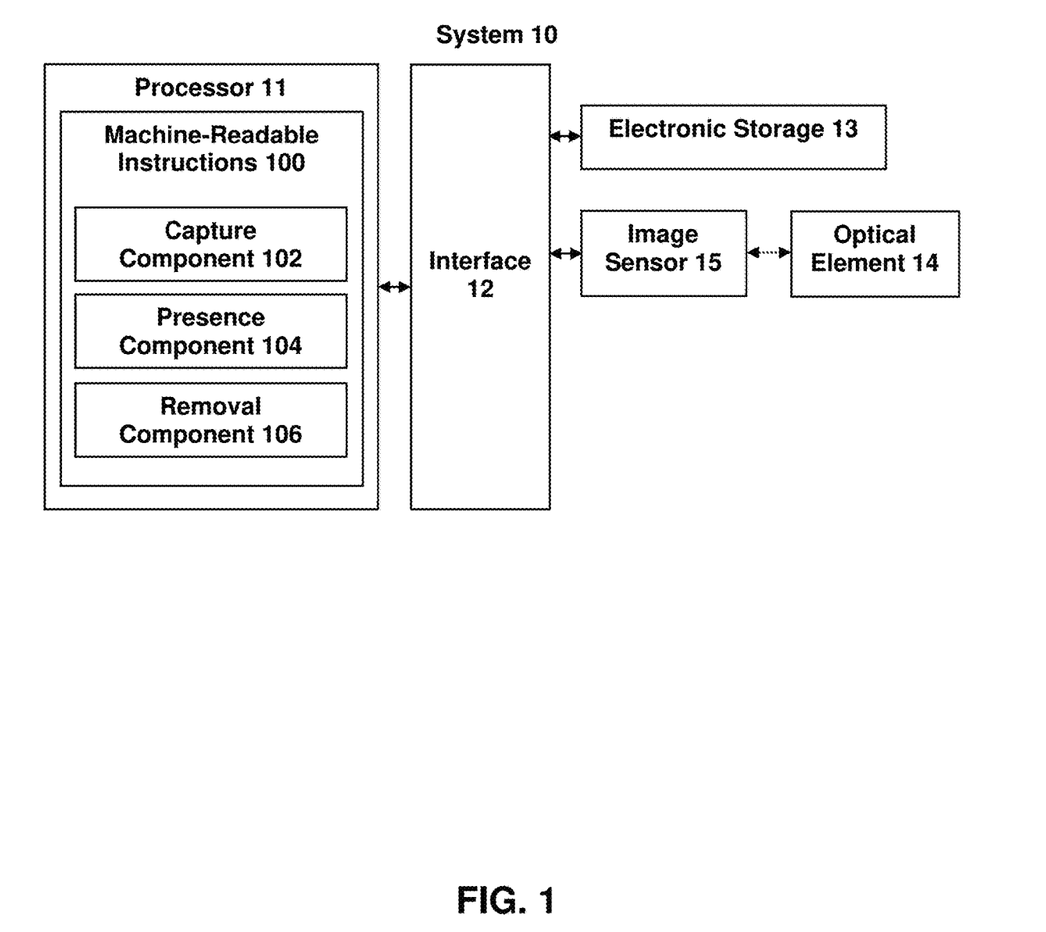
FIG. 1 illustrates an example system that removes liquid drops.

FIG. 1 illustrates a system 10 for removing liquid drops. The system 10 may include one or more of a processor 11, an interface 12 (e.g., bus, wireless interface), an electronic storage 13, an optical element 14, an image sensor 15, and/or other components. The system 10 may include and/or be part of an image capture device. The image capture device may include a housing, and one or more of the optical element 14, the image sensor 15, and/or other components of the system 10 may be carried by the housing the image capture device. The image sensor 15 may generate a visual output signal conveying visual information defining visual content based on light guided thereto by the optical element 14. The processor 11 may capture the visual content through the optical element 14 during a capture duration. Presence of a drop of liquid on the optical element 14 during the capture duration may be determined by the processor 11 based on analysis of the visual content and/or other information. Responsive to the presence of the drop of liquid on the optical element 14, removal of the drop of liquid from the optical element may be effectuated The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, information relating to optical element, information relating to liquid, information relating to drop of liquid on optical element, information relating to removal of drop of liquid from optical element, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the optical element 14 and/or the image sensor 15, of the system 10 may be carried by the housing of the image capture device.

Figure 3:
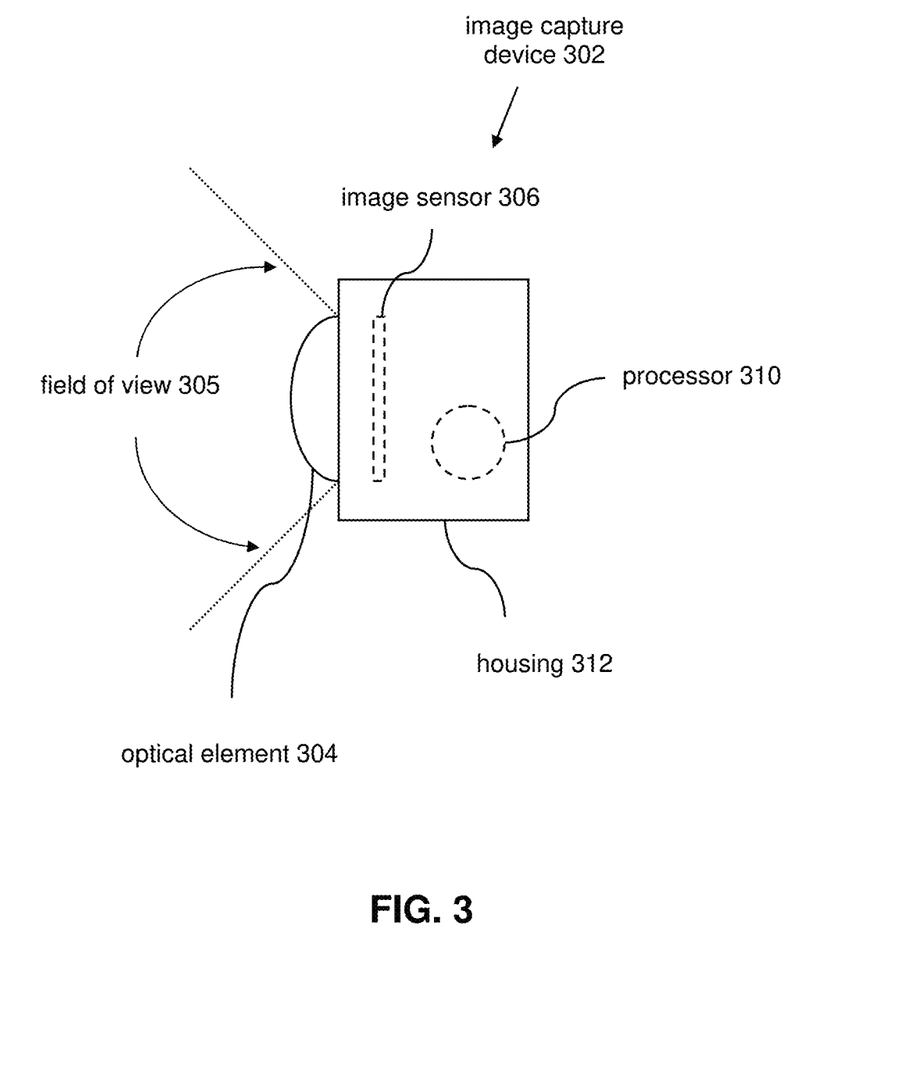
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a processor 310, and/or other components.

One or more components of the image capture device 302 may be the same as, be similar to, and/or correspond to one or more components of the system 10. For example, he processor 308 may be the same as, be similar to, and/or correspond to the processor 11. The optical element 304 may be the same as, be similar to, and/or correspond to the optical element 14. The optical element 306 may be the same as, be similar to, and/or correspond to the image sensor 15. The housing may carry other components, such as the electronic storage 13. The image capture device 302 may include other components not shown in FIG. 3, such as one or more of a display, an indictor light, a speaker, a motor, a haptic generator, an electric charge generator, a voltage generator, and/or other components. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

While the optical element 304 is shown as protruding from the housing 312, this is merely an example and is not meant to be limiting. In some implementations, the optical element 304 may be flush with and/or carried within the housing 312. In some implementations, one or more protective elements may cover one or portions of the optical element 304. For example, the optical element 304 may be covered and/or protected by one or more protective elements. A protective element may be and/or include one or more optical elements. For example, a protective element may include a transparent lens cover that allows light to pass through to the optical element 304 while protecting the optical element from physical impact.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be smaller than 180-degrees. In some implementations, the field of view 305 may be equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may capture visual content through the optical element 304 during a capture duration. The image capture device 302 may determine presence of one or more drops of liquid on the optical element 304 during the capture duration based on analysis of the visual content and/or other information. Responsive to the presence of the drop(s) of liquid on the optical element 304, the image capture device 302 may effectuate removal of the drop(s) of liquid from the optical element 304.

Referring back to FIG. 1, the processor 11 (or one or more components of the processor 11) may be configured to obtain information to facilitate removing liquid drops. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate removing liquid drops. The machine-readable instructions 100 may include one or more computer program components. The machine-readable instructions 100 may include one or more of a capture component 102, a presence component 104, a removal component 106, and/or other computer program components.

The capture component 102 may be configured to capture the visual content during one or more capture durations. The visual content may be captured through one or more optical elements (e.g., the optical element 14, the optical element 304, protective element of an optical element). A capture duration may refer to a time duration in which visual content is captured. Capturing visual content during a capture duration may include recording, storing, and/or otherwise capturing the visual content during the capture duration. The visual content may be captured for use in generating images and/or video frames. The visual content may be captured for use in determining the presence of one or more drops of liquid on the optical element(s).

For example, during a capture duration, the capture component 102 may use the visual output signal generated by the image sensor 15 and/or the visual information conveyed by the visual output signal to record, store, and/or otherwise capture the visual content. For instance, the capture component 102 may store, in the electronic storage 13 and/or other (permanent and/or temporary) electronic storage medium, information (e.g., the visual information) defining the visual content based on the visual output signal generated by the image sensor 15 and/or the visual information conveyed by the visual output signal during the capture duration. In some implementations, information defining the captured visual content may be stored in one or more visual tracks. In some implementations, the information defining the visual content may be discarded. For instance, the visual information defining the visual content may be temporarily stored for use in determining whether there are any drops of liquid on the optical element(s), and the visual information may be deleted after the determination.

The presence component 104 may be configured to determine presence of one or more drops of liquid on the optical element(s) during the capture duration. Liquid may refer to fluid. Liquid may refer to substance that move freely among themselves. For example, liquid may include water, oil, and/or other types of liquid. A drop of liquid may refer to a grouping of liquid, such as a rounded shape formed by the liquid on an optical element. Other shapes of liquid are contemplated.

Determining presence of a drop of liquid on an optical element may include determining whether or not a drop of liquid is on the optical element. For example, determining presence of a drop of liquid on the optical element 304 may include determining whether or not a drop of liquid is on the optical element 304. In some implementations, determining presence of a drop of liquid on an optical element may include determining whether or not a drop of liquid is on a protective element of the optical element. For example, determining presence of a drop of liquid on the optical element 304 may include determining whether or not a drop of liquid is on a protective element (e.g., transparent lens cover) of the optical element 304.

The presence of the drop(s) of liquid on an optical element may be determined based on analysis of the visual content and/or other information. Analysis of the visual content may include examination, evaluation, processing, studying, and/or other analysis of the visual content. For example, analysis of the visual content may include examination, evaluation, processing, studying, and/or other analysis of one or more visual features/characteristics of the visual content. Analysis of the visual content may include analysis of visual content of a single image and/or analysis of visual content of multiple images. For example, visual features and/or visual characteristics of a single image may be analyzed to determine whether one or more drops of liquid are on the optical element. Visual features and/or visual characteristics of multiple images may be analyzed to determine whether one or more drops of liquid are on the optical element.

In some implementations, the analysis of the visual content may include analysis of blurring within the visual content. Blurring of visual content may include visual content being less clear and/or less distinct. A drop of liquid on an optical element may cause one or more portions of the visual content captured through the optical element to be blurred. In some implementations, blurring of visual content may result in the portion of the visual content being dimmer than other portions of the visual content. Analysis of blurring within the visual content may include analysis of changes in brightness within the visual content. Based on blurring within the visual content, the presence component 104 may determine that a drop of liquid is on the optical element during capture duration.

In some implementations, the analysis of the visual content may include analysis of change in focus within the visual content. Focus may refer to quality and/or extent to which depictions in the visual content are clear. A drop of liquid on an optical element may cause change in focus of one or more portions of the visual content captured through the optical element. For example, a drop of liquid on an optical element may cause a portion of the visual content to be out of focus while other portions of the visual content are in focus (or vice versa). In some implementations, change in focus of the visual content may result in the portion of the visual content having less contrast than other portions of the visual content. Analysis of change in focus within the visual content may include analysis of changes in contrast within the visual content. Based on a change in focus within the visual content, the presence component 104 may determine that a drop of liquid is on the optical element during capture duration.

In some implementations, the analysis of the visual content may include analysis of repetitive depictions within the visual content. Repetitive depictions may refer to multiple depictions of a single object within the scene within the field of view of the optical element. A drop of liquid on an optical element may case deviation of light passing through the drop of liquid such that light from a single object hits different spots of the image sensor, resulting in the object (or a portion of the object) being depicted at multiple locations within the visual content. The repetitive depictions may depict the object in the same way or differently (e.g., depiction captured through the drop of liquid and the optical element being more distorted than depiction captured through the optical element). Based on a single object (or a portion of the object) being depicted at multiple locations within the visual content, the presence component 104 may determine that a drop of liquid is on the optical element during capture duration.

In some implementations, the analysis of the visual content may include analysis of shaky depictions within the visual content. Shaky depictions may refer to depictions that shake between visual content captured at different moment. Shaky depictions may include depictions that erratically changes position within the visual content and appears to be shaking when images are viewed in a sequence. A drop of liquid on an optical element may move (change in position, change shape) due to movement of the image capture device and/or environment of the image capture device (e.g., wind blowing on the image capture device). The drop of liquid on the optical element may move more erratically and/or with higher frequency (e.g., shake more) than the image capture device. The movement of the drop of liquid may cause light traveling through the drop of liquid to be pointed at different spots of the image sensor at different moments in the capture duration. The movement of the drop of liquid may cause shaky depictions within the visual content. Based on the visual cornet including shaky depiction, the presence component 104 may determine that a drop of liquid is on the optical element during capture duration.

Figure 4:
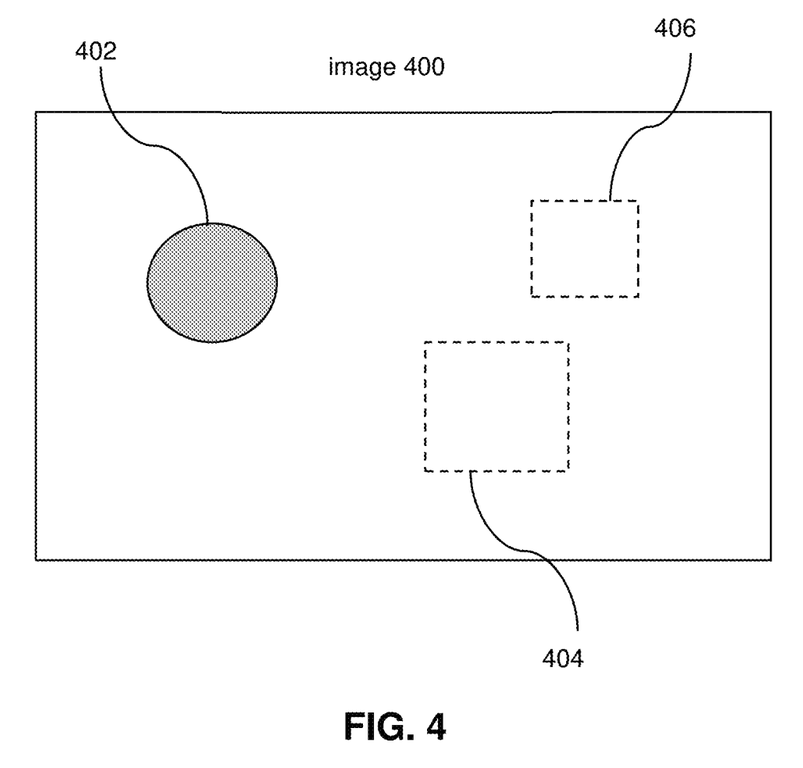
FIG. 4 illustrates an example image captured by an image capture device.

FIG. 4 illustrates an example image 400 captured by an image capture device. The image 400 may be captured through one or more optical elements. One or more drops of liquid may have been on the optical element(s) during capture of the image 400. The drop(s) of liquid on the optical element(s) may cause visual defects within the image 400. For example, a drop of liquid on the optical element(s) may cause a portion 402 of the image 400 to be blurry, out of focus, and/or include shaky depiction. A drop of liquid on the optical element(s) may cause depictions of a single object (or a portion of an object) to be included within both portions 404, 406.

In some implementations, visual features and/or visual characteristics across multiple images may be used to determine whether one or more drops of liquid are on the optical element. For example, the drop(s) of liquid may affect direction, deviation, and/or path of light passing through the drop(s) of liquid. The optical characteristics of the optical element may be used to predict movement/position of pixels across multiple images, and the pixels deviating from the predicted movement/position may indicate that drop(s) of liquid are affecting the direction, deviation, and/or path of light. Deviation of the pixels from the predicted movement/position may be used to determine that there are drop(s) of liquid on the optical element. Other analysis to determine presence of drop(s) of liquid on optical element are contemplated.

The removal component 106 may be configured, responsive to the presence of the drop(s) of liquid on the optical element(s), to effectuate removal of the drop(s) of liquid from the optical element(s). Effectuating removal of a drop of liquid from an optical element may include facilitating, causing, bringing about, putting into operation, and/or otherwise effectuating removal of the drop of liquid from the optical element. Effectuating removal of a drop of liquid from an optical element may include directly and/or indirectly removing the drop of liquid from the optical element.

In some implementations, the removal of the drop(s) of liquid from the optical element may be effectuated by causing an imbalance of electric charges on or proximate to the optical element. Imbalance of electric charges may include negatively charged particles (e.g., electrons) and/or positively charged particles (e.g., protons) being gathered together to cause a net charge and/or a difference in electric charges between two locations. For example, an imbalance of electric charges may be caused by application of an electric voltage to or proximate to the optical element. The imbalance of electric charges and/or the electric voltage may directly and/or indirectly move the drop(s) of liquid. For example, liquid molecules may be polar, with one side of the molecule being positively charged and the other side of the molecule being negatively charged. The imbalance of electric charges and/or the electric voltage may attract one side of the molecule with negative/positive charge while repelling the other side of the molecule with positive/negative charge. In some implementations, the optical element(s) may have hydrophobic surfaces. The imbalance of electric charges/electric voltage (electric field caused by the imbalance of electric charges/electric voltage) may cause electrowetting and cause the drop(s) of liquid to move across the surface of the optical element(s).

Causing imbalance of electric charges and/or applying electric voltage proximate to the optical element may include causing the imbalance of electric charges and/or applying the electric voltage sufficiently near the surface of the optical element on which the drop(s) of liquid are present so that force on the drop(s) of liquid caused by the imbalance of electric charges/electric voltage overcomes the force between the drop(s) of liquid and the surface of the optical element. Greater amount of electric charge imbalance and/or electric voltage may enable movement of larger drop(s) (heavier) of liquid and/or enable movement of drop(s) of liquid while causing the electric charge imbalance and/or applying the electric voltage further away from the optical element.

Figure 5A:
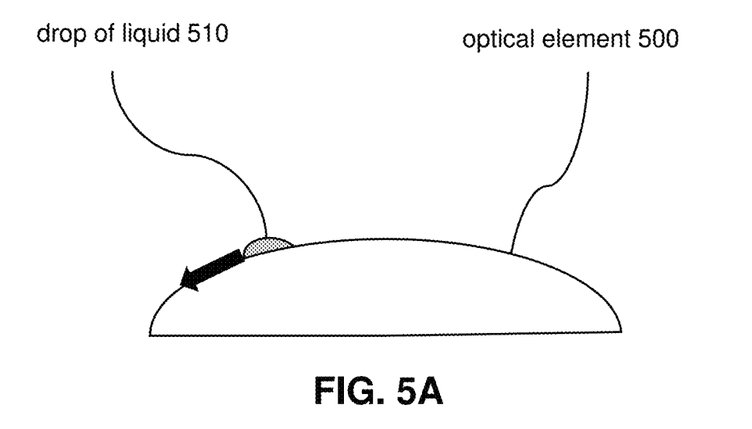
FIGS. 5A and 5B illustrate example removal of a drop of liquid from optical element.

FIG. 5A illustrates an example removal of a drop of liquid 510 from an optical element 500. The drop of liquid 510 may be located on the surface of the optical element 500. An imbalance of electric charges and/or electric voltage may be applied to and/or proximate to the optical element 500. For example, an imbalance of electric charges may be caused across the optical element 500 (e.g., across left and right portions of the optical element 500; across top and bottom portions of the optical element 500). Electric voltage may be applied across the optical element 500. The imbalance of electric charges and/or electric voltage may cause the drop of liquid 510 to move across the surface of the optical element 500.

Figure 6A:
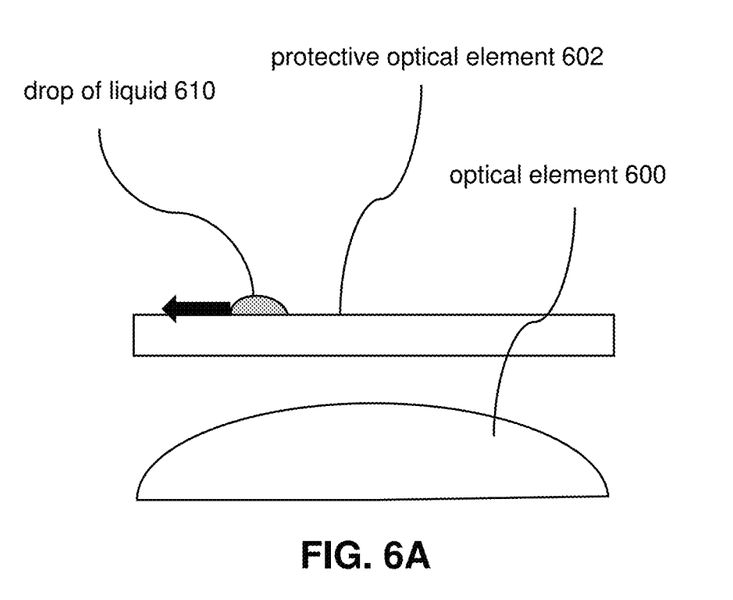
FIGS. 6A and 6B illustrate example removal of a drop of liquid from optical element.

FIG. 6A illustrates an example removal of a drop of liquid 610 from a protective optical element 602 (e.g., transparent lens cover). The protective optical element 602 may protect an optical element 600. The drop of liquid 610 may be located on the surface of the protective optical element 602. An imbalance of electric charges and/or electric voltage may be applied to and/or proximate to the protective optical element 602. For example, an imbalance of electric charges may be caused across the protective optical element 602 (e.g., across left and right portions of the protective optical element 602; across top and bottom portions of the protective optical element 602). Electric voltage may be applied across the protective optical element 602. The imbalance of electric charges and/or electric voltage may cause the drop of liquid 610 to move across the surface of the protective optical element 602.

In some implementations, the removal of the drop(s) of liquid from the optical element may be effectuated by causing vibration of the optical element. Vibration of the optical element may include movement of the optical element. Vibration of the optical element may include oscillating movement of the optical element. Vibration of the optical element may be caused by directly vibrating the optical element and/or indirectly vibrating the optical element by causing vibration of the image capture device/housing of the image capture device. The vibration of the optical element may move the drop(s) of liquid. For example, the vibration of the optical element may cause the drop(s) of liquid to slide off the surface of the optical element and/or to be flung off the surface of the optical element.

Figure 5B:
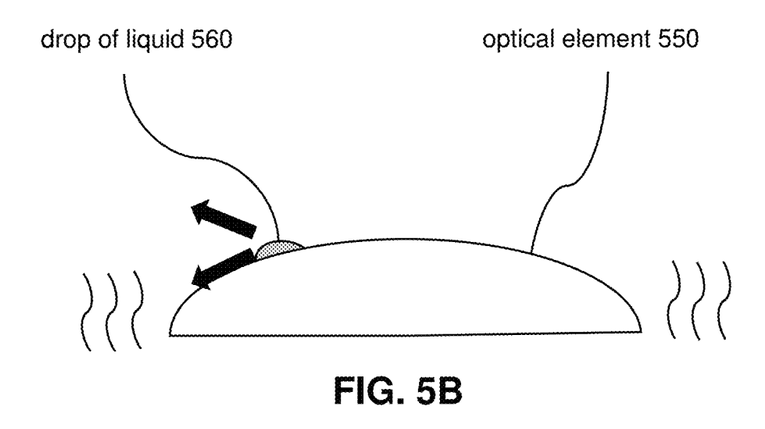

FIG. 5B illustrates an example removal of a drop of liquid 560 from an optical element 550. The drop of liquid 560 may be located on the surface of the optical element 550. The optical element 550 may be vibrated by directly vibrating the optical element 550 and/or by indirectly vibrating the optical element 550 through vibration of the image capture device/housing of the image capture device. The vibration of the optical element 550 may cause the drop of liquid 560 to move across the surface of the optical element 550 or be separated from the surface of the optical element 550.

Figure 6B:
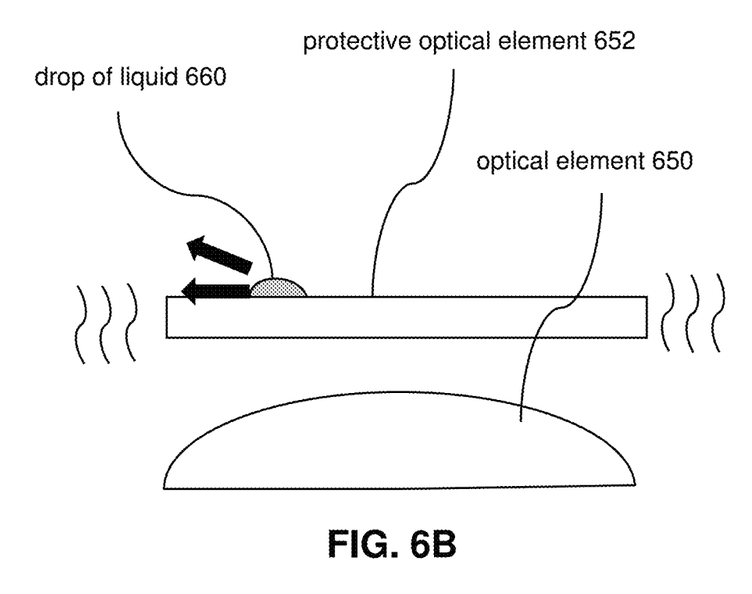

FIG. 6B illustrates an example removal of a drop of liquid 660 from a protective optical element 652 (e.g., transparent lens cover). The protective optical element 652 may protect an optical element 650. The drop of liquid 660 may be located on the surface of the protective optical element 652. The protective optical element 652 may be vibrated by directly vibrating the protective optical element 652 and/or by indirectly vibrating the protective optical element 652 through vibration of the image capture device/housing of the image capture device. The vibration of the protective optical element 652 may cause the drop of liquid 660 to move across the surface of the protective optical element 652 or be separated from the surface of the protective optical element 652.

In some implementations, the removal of the drop(s) of liquid from the optical element(s) may be effectuated by generating one or more alarms. An alarm may indicate the presence of the drop(s) of liquid on the optical element(s). An alarm may include a warning to one or more users of the image capture device that one or more drop of liquid are present on one or more optical elements of the image capture device. In some implementations, an alarm may be specific as to on which of the optical elements the drop(s) of the liquid are present. For example, for a spherical image capture device including multiple lens, an alarm may be a general alarm that drop(s) of liquid are present on some or all of the lens, or an alarm may be specific as to which of the lens has the drop(s) of liquid.

An alarm may include an audible alarm, a visible alarm, a haptic alarm, and/or other alarm. An audible alarm may refer to an alarm that is audibly provided. An audible alarm may be provided using sound. For example, responsive to detecting presence of a drop of liquid on an optical element of an image capture device, the image capture device may generate and/or playback sounds (using speaker(s) of the image capture device) that the drop of liquid is on the optical element. The audible alarm may include words (e.g., words describing liquid drop on the optical element, words instructing the user to remove liquid drop from the optical element), non-word sounds (e.g., beeping noise, music), and/or other sounds.

A visible alarm may refer to an alarm that is visibly provided. A visible alarm may be provided using light. For example, responsive to detecting presence of a drop of liquid on an optical element of an image capture device, the image capture device may generate light (using display(s) and/or indicator light(s) of the image capture device) associated with the drop of liquid being on the optical element. The visible alarm may include one or more colors, static and/or dynamic light (e.g., blinking light), depiction of words (e.g., presenting on display(s) statement about liquid drop being on the optical element, presenting on display(s) statement instructing the user to remove liquid drop from the optical element), and/or other visible alarm.

A haptic alarm may refer to an alarm that is haptically provided. A haptic alarm may be provided using touch and/or motion. For example, responsive to detecting presence of a drop of liquid on an optical element of an image capture device, the image capture device may be vibrated (using motor(s) and/or haptic generator(s) of the image capture device). The vibration of the image capture device may include continuous vibration (for a period of time) and/or periodic vibration. The vibration may indicate to the user of the image capture device that the drop of liquid is on the optical element. Use of other haptics are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
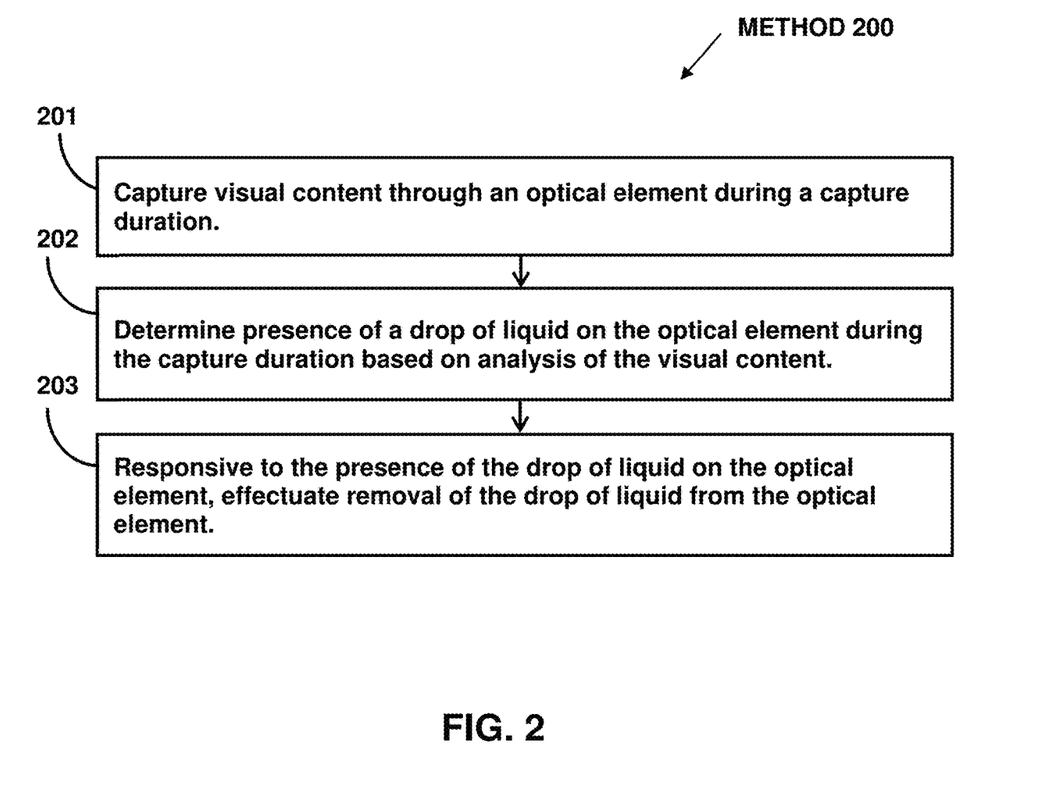
FIG. 2 illustrates an example method for removing liquid drops.

FIG. 2 illustrates method 200 for removing liquid drops. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include an image sensor, an optical element, and/or other components. The image sensor may be configured to generate a visual output signal conveying visual information based on light guided thereto by the optical element. The visual information may define visual content.

At operation 201, the visual content may be captured through the optical element during a capture duration. In some implementation, operation 201 may be performed by a processor component the same as or similar to the capture component 102 (Shown in FIG. 1 and described herein).

At operation 202, presence of a drop of liquid on the optical element during the capture duration may be determined based on analysis of the visual content and/or other information. In some implementations, operation 202 may be performed by a processor component the same as or similar to the presence component 104 (Shown in FIG. 1 and described herein).

At operation 203, responsive to the presence of the drop of liquid on the optical element, removal of the drop of liquid from the optical element may be effectuated. In some implementations, operation 203 may be performed by a processor component the same as or similar to the removal component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for removing liquid drops, the image capture device comprising:
    a housing;
    an image sensor carried by the housing and configured to generate a visual output signal conveying visual information based on light that becomes incident thereon, the visual information defining visual content;

a lens carried by the housing and configured to guide light within a field of view to the image sensor, a transparent lens cover covering the lens, the transparent lens cover allowing the light to pass through to the lens while protecting the lens from physical impact; and one or more physical processors configured by machine-readable instructions to:
- capture the visual content during a capture duration, the visual content captured through the lens;
- determine presence of a drop of liquid on the transparent lens cover during the capture duration based on analysis of the visual content, wherein the analysis of the visual content includes analysis of repetitive depictions within the visual content, wherein the presence of the drop of liquid on transparent lens cover is determined based on the repetitive depictions within the visual content including a single object within a scene within the field of view of the lens being depicted at multiple locations at a same time within the visual content; and
- responsive to the presence of the drop of liquid on the transparent lens cover, effectuate removal of the drop of liquid from the transparent lens cover.

2. The image capture device of claim 1, wherein the removal of the drop of liquid from the transparent lens cover is effectuated by causing an imbalance of electric charges on or proximate to the transparent lens cover, the imbalance of electric charges moving the drop of liquid.

3. The image capture device of claim 1, wherein the removal of the drop of liquid from the transparent lens cover is effectuated by application of an electric voltage to the transparent lens cover, the electric voltage moving the drop of liquid.

4. The image capture device of claim 1, wherein the removal of the drop of liquid from the transparent lens cover is effectuated by causing vibration of the transparent lens cover, the vibration of the transparent lens cover moving the drop of liquid.

5. The image capture device of claim 1, wherein the removal of the drop of liquid from the transparent lens cover is effectuated by generating an alarm, the alarm indicating the presence of the drop of liquid on the transparent lens cover.

6. The image capture device of claim 1, wherein the analysis of the visual content includes analysis of blurring within the visual content, wherein the presence of the drop of liquid on the transparent lens cover is determined based on the blurring within the visual content including a portion of the visual content becoming less clear or less distinct than other portions of the visual content or the portion of the visual content becoming dimmer than the other portions of the visual content.

7. The image capture device of claim 1, wherein the analysis of the visual content includes analysis of change in focus within the visual content, wherein the presence of the drop of liquid on the transparent lens cover is determined based on the change in focus within the visual content including a difference in focus between a portion of the visual content and other portions of the visual content or the portion of the visual content having less contrast than the other portions of the visual content.

8. The image capture device of claim 1, wherein the analysis of the visual content includes analysis of shaky depictions within the visual content, wherein the presence of the drop of liquid on the transparent lens cover is determined based on the shaky depictions within the visual content including a depiction within the visual content that changes with higher frequency than movement of the image capture device.

9. A method for removing liquid drops, the method performed by an image capture device including one or more processors, an image sensor, a lens, and a transparent lens cover, the image sensor configured to generate a visual output signal conveying visual information based on light that becomes incident thereon, the visual information defining visual content, the lens configured to guide light within a field of view to the image sensor, the transparent lens cover covering the lens, the transparent lens cover allowing the light to pass through to the lens while protecting the lens from physical impact, the method comprising:
- capturing the visual content during a capture duration, the visual content captured through the lens;
- determining presence of a drop of liquid on the transparent lens cover during the capture duration based on analysis of the visual content, wherein the analysis of the visual content includes analysis of repetitive depictions within the visual content, wherein the presence of the drop of liquid on transparent lens cover is determined based on the repetitive depictions within the visual content including a single object within a scene within the field of view of the lens being depicted at multiple locations at a same time within the visual content; and
- responsive to the presence of the drop of liquid on the transparent lens cover, effectuating removal of the drop of liquid from the transparent lens cover.

10. The method of claim 9, wherein the removal of the drop of liquid from the transparent lens cover is effectuated by causing an imbalance of electric charges on or proximate to the transparent lens cover, the imbalance of electric charges moving the drop of liquid.

11. The method of claim 9, wherein the removal of the drop of liquid from the transparent lens cover is effectuated by application of an electric voltage to the transparent lens cover, the electric voltage moving the drop of liquid.

12. The method of claim 9, wherein the removal of the drop of liquid from the transparent lens cover is effectuated by causing vibration of the transparent lens cover, the vibration of the transparent lens cover moving the drop of liquid.

13. The method of claim 9, wherein the removal of the drop of liquid from the transparent lens cover is effectuated by generating an alarm, the alarm indicating the presence of the drop of liquid on the transparent lens cover.

14. The method of claim 9, wherein the analysis of the visual content includes analysis of blurring within the visual content, wherein the presence of the drop of liquid on the transparent lens cover is determined based on the blurring within the visual content including a portion of the visual content becoming less clear or less distinct than other portions of the visual content or the portion of the visual content becoming dimmer than the other portions of the visual content.

15. The method of claim 9, wherein the analysis of the visual content includes analysis of change in focus within the visual content, wherein the presence of the drop of liquid on the transparent lens cover is determined based on the change in focus within the visual content including a difference in focus between a portion of the visual content and other portions of the visual content or the portion of the visual content having less contrast than the other portions of the visual content.

16. The method of claim 9, wherein the analysis of the visual content includes analysis of shaky depictions within the visual content, wherein the presence of the drop of liquid on the transparent lens cover is determined based on the shaky depictions within the visual content including a depiction within the visual content that changes with higher frequency than movement of the image capture device.

17. An image capture device for removing liquid drops, the image capture device comprising:

a housing;

an image sensor carried by the housing and configured to generate a visual output signal conveying visual information based on light that becomes incident thereon, the visual information defining visual content;

a lens carried by the housing and configured to guide light within a field of view to the image sensor, a transparent lens cover covering the lens, the transparent lens cover allowing the light to pass through to the lens while protecting the lens from physical impact; and one or more physical processors configured by machine-readable instructions to:

capture the visual content of a video during a capture duration, the visual content captured through the lens;

determine presence of a drop of liquid on the transparent lens cover during the capture duration based on analysis of repetitive depictions within the visual content, wherein the presence of the drop of liquid on transparent lens cover is determined based on the repetitive depictions within the visual content including a single object within a scene within the field of view of the lens being depicted at multiple locations at a same time within the visual content; and responsive to the presence of the drop of liquid on the transparent lens cover, effectuate removal of the drop of liquid from the transparent lens cover.

18. The image capture device of claim 17, wherein the removal of the drop of liquid from the transparent lens cover is effectuated by:

causing an imbalance of electric charges on or proximate to the transparent lens cover, the imbalance of electric charges moving the drop of liquid;

application of an electric voltage to the transparent lens cover, the electric voltage moving the drop of liquid; or causing vibration of the transparent lens cover, the vibration of the transparent lens cover moving the drop of liquid.

\* \* \* \* \*